(12) United States Patent
Strickland et al.

(10) Patent No.: US 8,831,521 B2
(45) Date of Patent: Sep. 9, 2014

(54) CIRCUITS AND METHODS OF LOW-FREQUENCY NOISE FILTERING

(75) Inventors: Ken A. Strickland, Buda, TX (US); Mark W. May, Austin, TX (US); Scott Thomas Haban, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 364 days.

(21) Appl. No.: 12/975,334

(22) Filed: Dec. 21, 2010

(65) Prior Publication Data

US 2012/0157031 A1 Jun. 21, 2012

(51) Int. Cl.
*H04B 1/00* (2006.01)
*H04B 1/10* (2006.01)

(52) U.S. Cl.
CPC .................................. *H04B 1/1036* (2013.01)
USPC .......................................... 455/63.1; 455/296

(58) Field of Classification Search
USPC .............. 455/296, 146, 324, 131; 381/13, 15; 375/319, 346, 316
See application file for complete search history.

(56) References Cited

U.S. PATENT DOCUMENTS

| | | | | |
|---|---|---|---|---|
| 5,724,653 | A * | 3/1998 | Baker et al. | 455/296 |
| 5,909,644 | A * | 6/1999 | Tomiyama | 455/146 |
| 6,115,593 | A * | 9/2000 | Alinikula et al. | 455/324 |
| 6,360,090 | B1 * | 3/2002 | Holcombe et al. | 455/307 |
| 7,043,026 | B1 * | 5/2006 | Shiraishi et al. | 381/13 |
| 7,440,737 | B2 * | 10/2008 | Su | 455/223 |
| 8,014,478 | B2 * | 9/2011 | Liu et al. | 375/346 |
| 8,019,007 | B2 * | 9/2011 | Boppana et al. | 375/260 |
| 8,358,994 | B2 * | 1/2013 | Li | 455/296 |
| 2011/0044414 | A1 * | 2/2011 | Li | 375/350 |

* cited by examiner

*Primary Examiner* — April G Gonzales
(74) *Attorney, Agent, or Firm* — Cesari & Reed, LLP; R. Michael Reed (57) ABSTRACT

A circuit includes an input terminal for receiving a radio frequency (RF) signal and a noise mitigation circuit coupled to the input terminal. The noise mitigation circuit is configured to detect a low-frequency noise signature in the RF signal and to automatically adjust an attenuation network to filter low-frequency noise from the RF signal in response to detecting the low-frequency noise signature.

23 Claims, 3 Drawing Sheets

CIRCUITS AND METHODS OF LOW-FREQUENCY NOISE FILTERING

FIELD

The present disclosure is generally related to radio frequency receiver circuits, and more particularly to circuits and methods of low-frequency noise filtering.

BACKGROUND

When an amplitude modulated (AM) radio frequency receiver moves near a source of low-frequency noise (such as power-line noise, traffic light noise, Integrated Services Digital Network (ISDN) noise, other low-frequency noise and their associated harmonics), low-frequency noise couples into the received AM signal, producing interference, which can sometimes be presented as a distorted audio signal including static and/or interfering channel signals. AM radio signal receiver systems often include a sixty-Hertz "trap" circuit, including an inductor/resistor circuit, coupled to a signal input (such as a whip antenna) to filter the relatively low-frequency power-line noise from the received AM radio frequency signal. However, such circuitry adds to the overall cost and size of the circuit, and the "trap" circuit degrades the received AM radio frequency signal by adding a constant degradation to the signal even when no low-frequency noise is present.

SUMMARY

In an embodiment, a circuit includes an input terminal for receiving a radio frequency (RF) signal and a noise mitigation circuit coupled to the input terminal. The noise mitigation circuit is configured to detect a low-frequency noise signature in the RF signal and to automatically adjust an attenuation network to filter low-frequency noise from the RF signal in response to detecting the low-frequency noise signature.

In another embodiment, a method includes receiving a radio frequency (RF) signal at an input terminal of an integrated circuit and detecting a low-frequency noise signature in the RF signal using a controller of a receiver circuit. The method further includes automatically adjusting an attenuation network coupled to the input terminal to filter low-frequency noise from the RF signal in response to detecting the low-frequency noise signature.

In still another embodiment, an integrated circuit includes an input terminal configurable to couple to a signal source for receiving a radio frequency (RF) signal and includes a controller configured to detect a low-frequency noise signature within the RF signal and to generate an attenuation adjustment signal in response to detecting the low-frequency noise signature. Further, the integrated circuit includes a an attenuation network including a first input coupled to the input terminal and a second input coupled to the controller. The attenuation network filter is responsive to the attenuation adjustment signal to adjust a cut off frequency to filter low-frequency noise from the RF signal.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

While conventional systems include a low-frequency trap that degrades the RF signal even when no low-frequency noise is present, embodiments of an integrated circuit are described below that are configured to selectively filter the RF signal, as needed. The integrated circuit includes an input terminal for receiving a radio frequency (RF) signal and an attenuation network coupled to the input terminal. The attenuation network is responsive to a control signal from a controller to selectively adjust at least one of a resistive attenuation to filter low-frequency noise and a capacitive attenuation, which is wide-band and variable to attenuate all frequencies, to apply a desired attenuation to the RF signal. As used herein, the term "RF signal" refers to a signal having a frequency within a range of about 100 Hertz to several gigahertz. For example, medium wave radio frequency signals (AM radio signals) are within a range of approximately 520 kHz to 1.71 MHz. Within AM radio signals, the signal content is contained within the strength of the signal, which strength can be used to specify the sounds to be reproduced by a speaker, for example. Further, as used herein, the term "low-frequency noise" refers to signals having a frequency below the AM radio frequency range, including low-frequency noise of 100 kilohertz or less.

Figure 1:
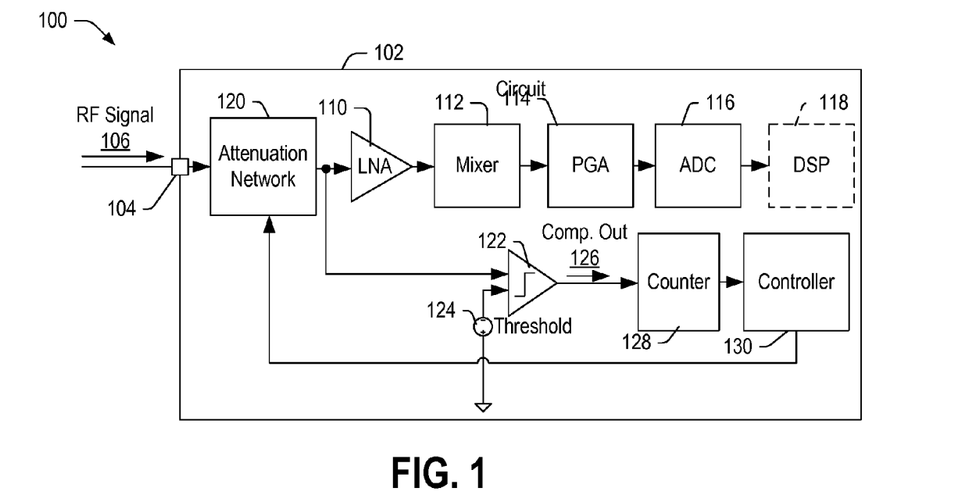
FIG. 1 is a block diagram of an embodiment of a receiver circuit for providing low-frequency noise filtering of a radio frequency signal.

FIG. 1 is a block diagram of an embodiment of a receiver circuit 100 for providing low-frequency noise filtering of a radio frequency signal. Receiver circuit 100 includes an integrated circuit 102 having an input terminal 104 for receiving a radio frequency (RF) signal 106. In an example, the RF input signal 106 is received from a signal source, such as an antenna. In a particular example, the antenna can be a whip antenna configured to receive a variety of radio frequency signals, including amplitude modulated (AM) radio frequency signals within a range of approximately 520 kHz to approximately 1.7 MHz. In some instances, the antenna may also receive interfering signals, such as low-frequency power-line noise from nearby power lines or noise from other sources (including lightening and/or various nearby obstructions).

Integrated circuit 102 includes a low noise amplifier 110 having an input connected to input terminal 104 and an output, which is connected to an input of a mixer 112. Mixer 112 includes an output connected to an input of a programmable gain amplifier (PGA) 114, which has an output connected to an input of a analog-to-digital converter (ADC) 116. ADC 116 has an output connected to a digital signal processor (DSP) 118. LNA 110, mixer 112, PGA 114, and ADC 116 provide a first signal path from input terminal 104 to DSP 118.

Integrated circuit 102 further includes low-frequency noise mitigation circuitry configured to filter received radio frequency signals to reduce or eliminate low-frequency noise. The low-frequency noise mitigation circuitry includes an attenuation network 120 having a first input connected to input terminal 104 and a second input connected to a controller 130. Attenuation network 120 includes a resistive attenuation configurable to attenuate low-frequency noise and a capacitive attenuation that is wide-band and attenuates the entire frequency band. Low-frequency noise mitigation circuitry further includes a comparator 122 having a first input connected to input terminal 104, a second input connected to a comparator threshold 124, and an output for providing a comparator output signal 126 to counter 128. In this instance, comparator threshold 124 is a voltage reference signal indicating a peak voltage level. Counter 128 includes an input connected to the output of comparator 122 and an output connected to controller 130.

When low-frequency noise (such as power-line noise and its harmonics) on an AM-band carrier crosses comparator threshold 124, the low-frequency noise is at a frequency that is significantly lower than the carrier frequency of RF input signal 106. The low-frequency noise increases the overall amplitude of RF input signal 106 slowly while the carrier signal of RF input signal 106 varies rapidly. As a result, the carrier signal of RF input signal 106 oscillates, crossing comparator threshold 124 multiple times, which causes comparator output signal 126 to toggle. In the context of an AM radio frequency signal, comparator output signal 126 transitions multiple times at a frequency corresponding to the carrier frequency of RF input signal 106. Controller 130 is configured to detect a low-frequency noise signature based on the comparator output signal 126. In particular, the low-frequency noise signature is characterized by the RF signal 106 crossing a peak threshold slowly over a period of time, during which time the comparator output signal 126 transitions. An example of the comparator output behavior is described below with respect to FIG. 2.

Figure 2:
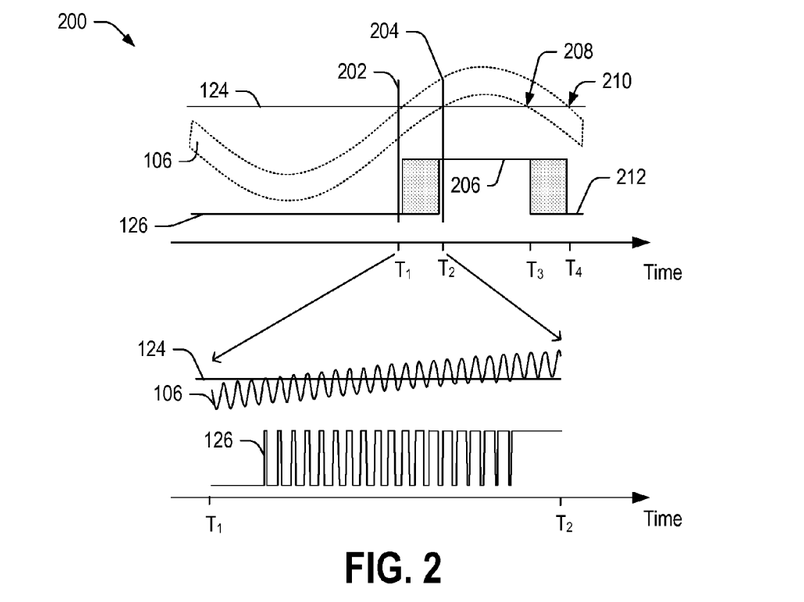
FIG. 2 is a diagram depicting representative examples of a portion of a radio frequency signal, a peak threshold level and a comparator output signal for an embodiment of the circuit of FIG. 1.

FIG. 2 is a diagram 200 depicting representative examples of a portion of RF input signal 106, comparator threshold 124, and comparator output signal 126 for an embodiment of the circuit 102 of FIG. 1. RF input signal 106 includes a time-varying carrier signal and includes low-frequency noise that causes the RF input signal 106 to slowly increase to a peak level that is above a level associated with comparator threshold 124. Comparator output signal 126 remains at a low level until RF input signal 106 crosses comparator threshold 124 at first time $(T_1)$ 202.

As mentioned above, RF input signal 106 includes a carrier frequency signal that is time-varying at a higher frequency than the low-frequency noise. As a result, during a time period between first time $(T_1)$ 202 and a second time $(T_2)$ 204, the overall amplitude of RF input signal 106 increases slowly due to low-frequency noise. At first time $(T_1)$ 202, an oscillation of carrier frequency signal includes a rising edge that crosses comparator threshold 124 and a falling edge that also crosses comparator threshold 124. As the overall amplitude of RF input signal 106 continues to increase, oscillations of the carrier signal of RF input signal 106 cross and re-cross comparator threshold 124. These oscillations cause comparator 122 to transition multiple times, producing multiple pulses in the comparator output signal 126 over the brief period of time between first and second times $(T_1$ and $T_2)$ 202 and 204. At second time $(T_2)$, the overall amplitude of RF input signal 106 combined with the low-frequency noise reaches a peak amplitude that is sufficiently high that the carrier frequency signal oscillations no longer cross comparator threshold 124, allowing comparator output signal 126 to stabilize at 206.

Comparator output signal 126 remains static until a third time (T3) 208, when the low-frequency noise level decreases relatively slowly to a level that the higher frequency carrier signal oscillations begin to once again cross and re-cross comparator threshold 124, causing comparator output signal 126 to transition multiple times between third time $(T_3)$ 208 and a fourth time $(T_4)$ 210. At fourth time $(T_4)$ 210, the overall amplitude of RF input signal 106 falls to a peak amplitude that is sufficiently low that the carrier frequency signal oscillates below comparator threshold 124, allowing comparator output signal 126 to once again stabilize at 212.

The brief periods of oscillations of comparator output signal 126, such as oscillations that cross comparator threshold 124 between first time $(T_1)$ and second time $(T_2)$, represent a low-frequency noise signature. As used herein, the term "low-frequency noise signature" refers to a distinctive signal pattern, which can be detected by setting a virtual threshold (such as peak threshold 124) and looking for a group or cluster of instances within a relatively short time window where the RF input signal 106 crosses and re-crosses the peak threshold 124. The relatively slow-changing characteristic of the low-frequency noise causes the higher frequency carrier signal to cross the peak threshold 124 multiple times within a brief period of time. In particular, such periods of oscillations can represent low-frequency power-line noise, traffic light noise, ISDN line noise, and other low-frequency noise within a frequency range below that of a carrier frequency of a frequency band of interest. The multiple oscillations within a short period of time (such as less than a half-cycle of the low-frequency signal) make it possible to detect the low-frequency noise even before the frequency of the noise is known. Thus, the noise mitigation circuitry can utilize the low-frequency noise signature to detect the presence of low-frequency noise and to adjust the attenuation network 120 to filter the low-frequency noise more quickly than conventional detection circuitry.

While the circuit 100 in FIG. 1 is configured to detect the low-frequency noise signature within RF signal 106, controller 130 may need further information to determine how to adjust attenuation network 120 to suitably attenuate the RF signal 106. An embodiment of a circuit configured to detect the low-frequency noise signature and to adjust the low-frequency noise signature based on the amplitude of an in-band portion of RF signal 106 is described below with respect to FIG. 3.

Figure 3:
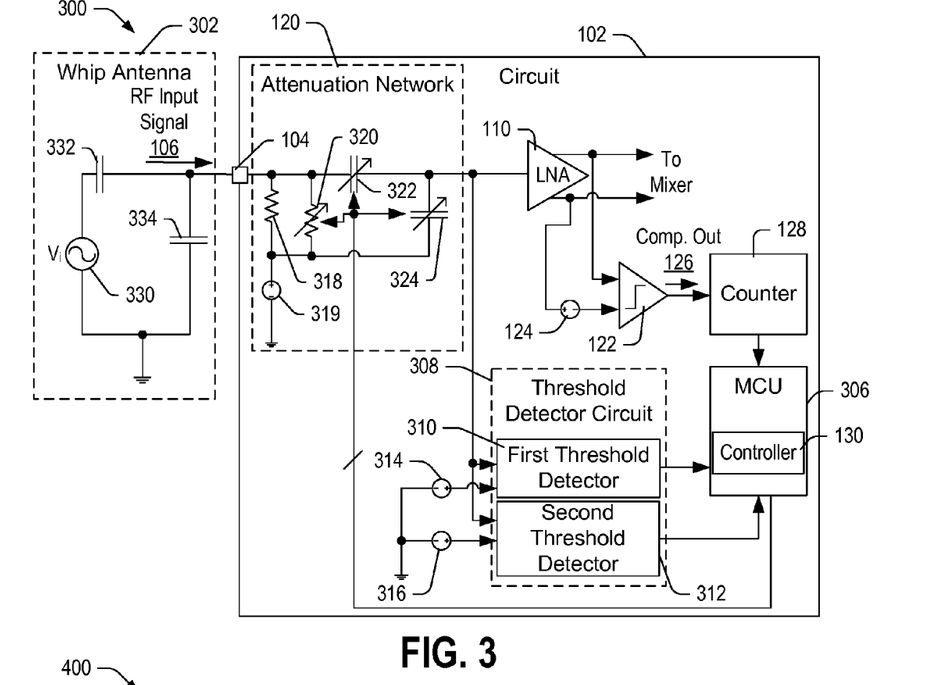
FIG. 3 is a block diagram of an embodiment of a system including a portion of the receiver circuit of FIG. 1 and including an adjustable attenuation network for providing low-frequency noise filtering of the radio frequency signal.

FIG. 3 is a block diagram of an embodiment of a system 300 including a portion of the receiver circuit 100 of FIG. 1 including adjustable attenuation network 120 for providing low-frequency noise filtering of RF input signal 106. System 300 includes a whip antenna 302, which is represented by a voltage source 330 and capacitors 332 and 334. Voltage source 330 has a first terminal connected to ground and a second terminal connected to a first electrode of capacitor 332, which has a second electrode connected to input terminal 104 of circuit 102. Capacitor 334 includes a first electrode connected to the second terminal of inductor 332 and a second electrode connected to ground.

Circuit 102 includes attenuation network 120 having an input connected to input terminal 104 and at least one control input connected to a micro control unit (MCU) 306, which is configured to implement controller 130. Circuit 102 further includes LNA 110, comparator 122, and counter 128, which has an output connected to MCU 306. In this example, LNA 110 takes a single-ended input, amplifies it, and creates a differential output voltage referenced to a supply voltage, which is provided to a mixer. Comparator 122 includes a first input connected to a first output of LNA 110 and a second input coupled to a second output of LNA 110 through a voltage offset corresponding to comparator threshold 124.

Further, circuit 102 includes a threshold detector circuit 308. Threshold detector circuit 308 includes a first threshold detector 310 having a first input connected an input of LNA 110, a second input connected to a first reference threshold 314, and an output connected to MCU 306. Threshold detector circuit 308 further includes a second threshold detector 312 having a first input connected on the input of LNA 110, a second input connected to a second reference threshold 316, and an output connected to MCU 306. While first threshold detector 310 and second threshold detector 312 are described as having an input connected to the input of LNA 110, it should be appreciated that first and second threshold detectors 310 and 312 could be connected to differential outputs of LNA 110. In such an embodiment, the first and second reference thresholds 314 and 316 can be referenced to the differential outputs of LNA 110, similar to comparator 122 as described above.

Attenuation network 120 includes a resistor 318 having a first terminal connected to input terminal 104 and a second terminal connected to a low-impedance voltage source 319. Attenuation network 120 further includes a variable resistor 320 connected in parallel with resistor 318. Attenuation network 120 also includes variable capacitors 322 and 324. Variable capacitor 322 includes a first electrode connected to input terminal 104 and a second electrode connected to the input of LNA 110. Variable capacitor 324 includes a first electrode connected to the input of LNA 110 and a second electrode connected to low-impedance voltage source 319. Variable resistor 320 provides an adjustable resistive attenuation to attenuate low-frequency noise, and variable capacitors 322 and 324 cooperate to provide an adjustable capacitive attenuation for attenuating the entire frequency band.

In an example, as comparator 122 detects the carrier frequency oscillations crossing and re-crossing comparator threshold 124 multiple times during a brief period, counter 128 counts the oscillations and provides the count to MCU 306. MCU 306 implements controller 130, which is configured to detect a low-frequency noise signature in the RF input signal 106 based on this count and responds by configuring attenuation network 120 based on information from first and second threshold detectors 310 and 312. In particular, MCU 306 monitors the count and outputs of first and second peak detectors 310 and 312 and selectively adjusts attenuation network 120 in response thereto.

First and second threshold detectors 310 and 312 are in-band peak detectors that do not detect or respond to low-frequency noise. While first and second threshold detectors 310 and 312 are depicted as being referenced to ground, it should be appreciated that the ground depicted may be mid-rail voltage level, making it possible for first and second threshold detectors 310 and 312 to monitor peak amplitudes within an in-band portion of RF signal 106 while ignoring the low-frequency noise. Further, first and second threshold detectors 310 and 312 may be simple peak detectors configured to detect when RF signal 106 crosses the first and second thresholds 314 and 316, respectively. In contrast, comparator 122 is a wide-band peak detector that detects the low-frequency variations across the entire frequency range and that is configured to detect the low-frequency noise signature.

In a first mode, controller 130 has not detected the low-frequency noise signature for an extended period of time (such as one or more seconds). In a second mode, controller 130 has not detected the low-frequency noise signature for a brief period of time (such as a period of 300 milliseconds). In a third mode, controller 130 has detected the low-frequency noise signature. Depending on the mode, MCU 306 selectively increases or decreases the resistive attenuation and/or the capacitive attenuation.

In a first example, when MCU 306 is in the first mode, MCU 306 receives signals from first peak detector 310 and second peak detector 312. If the first peak detector 310 and second peak detector 312 indicate that RF input signal 106 is at a level that is below first (high) reference threshold 314 and second (low) reference threshold 316, MCU 306 decreases the resistive attenuation of attenuation network 120 by decreasing a resistance of variable resistor 320 if the resistive attenuation is greater than zero. Otherwise, MCU 306 decreases the capacitive attenuation by adjusting at least one of variable capacitors 322 and 324, causing attenuation network 120 to attenuate all frequency components of RF signal 106.

In a second example when MCU 306 is in the first mode, if RF input signal 106 crosses second reference threshold 316 but not first reference threshold 314, MCU 306 decreases the resistive attenuation if the capacitive attenuation is less than a maximum capacitive attenuation. If RF input signal 106 crosses both first and second reference thresholds 314 and 316, if the capacitive attenuation is less than a maximum capacitive attenuation (in other words, if there is headroom to increase the capacititive attenuation), MCU 306 increases the capacitive attenuation, attenuating all frequency components of RF signal 106. Otherwise, MCU 306 increases the resistive attenuation, attenuating a low-frequency portion of RF signal 106.

In the second mode, depending on the outputs of first and second peak detectors 310 and 312, MCU 306 selectively increases or decreases the attenuation. In one instance when RF input signal 106 does not cross second reference threshold 316 or first reference threshold 314, MCU 306 does not adjust either resitive or capacitive attenuations. In the third mode, MCU 306 increases the resistive attenuation when possible and otherwise increases the capacitive attenuation.

Illustrative examples of the adjustments to attenuation network 120 made by MCU 306 based on the first, second, and third modes are described below with respect to Table 1. In Table 1 below, a "1" value represents when RF input signal 106 exceeds first threshold 314 or second threshold 316, and a "0" value represents when RF input signal 106 is below first threshold 314 or second threshold 316.

TABLE 1

Attenuation Network 120 Adjustment Actions.

| Mode | First (High) Peak Detector | Second (Low) Peak Detector | Action to Peak Detection |
| --- | --- | --- | --- |
| 1st | 0 | 0 | If resistive attenuation > 0 then decrease resistive attenuation; else, decrease capacitive attenuation |
| 1st | 0 | 1 | If capacitive attenuation < max then decrease resistive attenuation |
| 1st | 1 | 1 | If capacitive attenuation < max then increase capacitive attenuation else, increase resistive attenuation |
| $2^{nd}$ | 0 | 0 | If resistive attenuation < max decrease capacitive attenuation |
| $2^{nd}$ | 0 | 1 | No Operation |
| $2^{nd}$ | 1 | 1 | if capacitive attenuation < max increase capacitive attenuation; else increase resistive attenuation |

TABLE 1-continued

Attenuation Network 120 Adjustment Actions.

| Mode | First (High) Peak Detector | Second (Low) Peak Detector | Action to Peak Detection |
|---|---|---|---|
| 3rd | 0 | 0 | if resistive attenuation < max increase resistive attenuation; else increase capacitive attenuation |
| 3rd | 0 | 1 | if resistive attenuation < max increase resistive attenuation; else increase capacitive attenuation |
| 3rd | 1 | 1 | if resistive attenuation < max increase resistive attenuation; else increase capacitive attenuation |

In Table 1, the term "max" refers to a corresponding threshold, which may represent a maximum value to which the resistive or capacitive attenuation can be set. In some instances, the term "max" can be a threshold level that may be a percentage of the maximum value. In an embodiment, the "max" values can be configured to an operator. In another embodiment, the "max" values are pre-configured.

During operation, when the counter 128 counts a threshold number of pulses in comparator output signal 126, MCU 306 detects the low-frequency noise signature. MCU 306 receives signals from first and second threshold detectors 310 and 312, switches to the third mode, and selectively adjusts the attenuation network 120 to increase one of the capacitive attenuation and the resistive attenuation. As soon as the adjustment is made, MCU 306 reverts to the second mode, resets counter 128, and monitors the output of the counter 128. Each time counter 128 counts the threshold number of pulses, MCU 306 switches to the third mode, adjusts the attenuation network 120 based on outputs from the first and second threshold detectors 310 and 312, and reverts back to the second mode. After a period of time of approximately a second, MCU 306 reverts to the first mode. In the first mode, MCU 306 monitors the outputs of first and second threshold detectors 310 and 312 and selectively reduces the resistive and/or capacitive attenuations applied by attenuation network 120.

In this way, MCU 306 applies a suitable attenuation based on the source of the noise (i.e., resistive attenuation for low-frequency noise, and capacitive attenuation for large in-band signals). Further, once the noise is no longer detected in RF input signal 106, MCU 306 reduces the attenuation of attenuation network 120. The ability to selectively reduce the resistive and/or capacitive attenuations of attenuation network 120 provides an advantage over systems that utilize a fixed inductor/capacitor low-frequency "trap" filter, for example, because such filters degrade the RF signal whether or not the noise is present.

Since MCU 306 detects the same low-frequency noise signature on both the rising edge and the falling edge of the low-frequency noise signal, MCU 306 can detect the presence of the low-frequency noise a minimum of twice during the low-frequency cycle. Further, since the low-frequency signal is relatively slow, MCU 306 can detect the presence of the low-frequency noise multiple times while RF signal 106 slowly crosses comparator threshold 124, i.e., during a single crossing of comparator threshold 124. With each "detection," MCU 306 can make an adjustment to the attenuation network 120, allowing MCU 306 to adjust attenuation network 120 multiple times during a single crossing of comparator threshold 124.

It should be appreciated that, within the AM radio frequency band, there are other noises, such as lightning, which should not be treated as low-frequency noise, but they have the potential to cause the RF input signal 106 to rise above the comparator threshold 124. Such noise spikes do not normally produce the same comparator output signal 126 as the low-frequency noise signature detectable by MCU 306. Instead, in response to such noise, the comparator output signal 126 produces one or two comparator transitions, instead of many comparator transitions as depicted in FIG. 2. MCU 306 is configured to detect such spikes in RF input signal 106 based on the output of counter 128 without interpreting the spikes as low-frequency noise requiring attenuation. In some instances, to avoid false detections through slow accumulation of counts associated with such spikes (for instance), MCU 306 may reset counter 128 periodically after a period suitable for detection of the multiple comparator threshold crossings corresponding to the low-frequency noise signature described above with respect to FIG. 2.

In some instances, MCU 306 applies attenuation adjustments using fixed steps (for example, in terms of decibels). In other instances, MCU 306 may selectively control the step size of an attenuation adjustment based on relative distance in terms of frequency between the low-frequency noise and the content of interest within RF input signal 106. Adjusting the attenuation network 120 shifts the corner frequency of the high pass to selectively filter the noise and its harmonics from RF input signal 106. Thus, the step size can be controllably adjusted to filter the low-frequency noise by such corner frequency adjustments.

While the above-examples have mentioned detection of the low-frequency noise signal and the first and second reference thresholds 314 and 316 for detection of an in-band portion of RF signal 106, it is important to understand that the band pass characteristic of threshold detectors 310 and 312 allows them to detect the peaks of the in-band portion of RF signal 106 while ignoring the low-frequency noise. A representative example of RF signal 106 and first and second thresholds 314 and 316 is described below with respect to FIG. 4.

Figure 4:
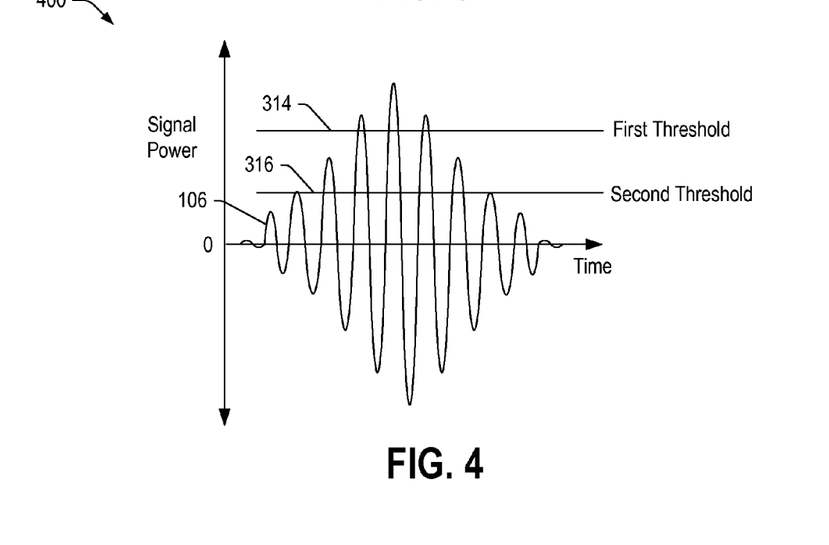
FIG. 4 is a diagram depicting representative examples of a portion of an AM radio frequency signal and first and second in-band thresholds for an embodiment of the circuit of FIG. 3.

FIG. 4 is a diagram 400 depicting representative examples of a portion of an AM RF signal 106 and first and second in-band thresholds 314 and 316 for an embodiment of the circuit of FIG. 3. RF signal 106 has a time-varying amplitude within a frequency range of interest. First and second threshold detectors 310 and 312 (in FIG. 3) are configured to detect the peak amplitude of an in-band portion of RF signal 106 with respect to first and second thresholds 314 and 316. With respect to the in-band portion of RF signal 106, the low-frequency noise has no impact.

While the above-examples describe an MCU 306 configured to implement controller 130, it should be appreciated that other implementations are also possible. In some instances, rather than implementing the controller 130 in firmware executable by MCU 306, it is possible to implement the controller 130 using logic circuitry. A simplified example of a receiver circuit 500 including controller 130 implemented as control logic is described below with respect to FIG. 5.

Figure 5:
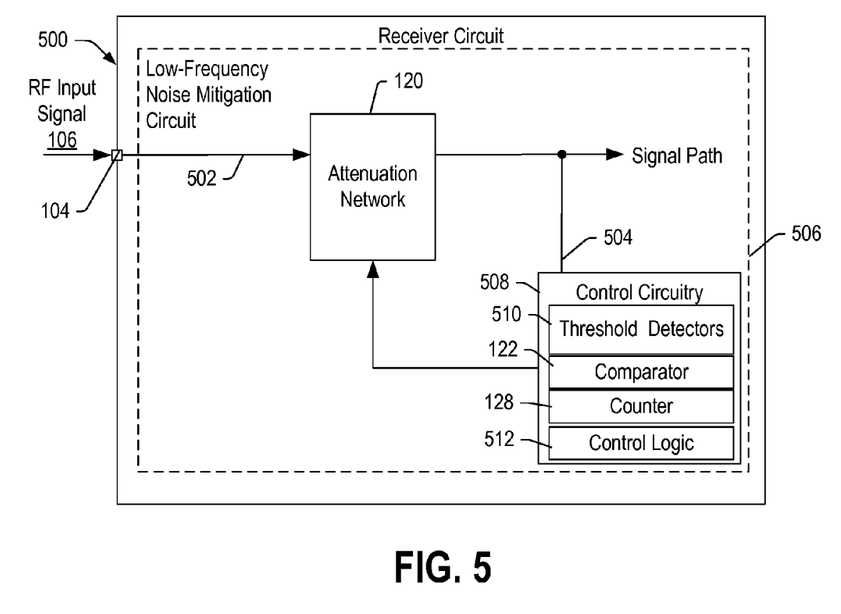
FIG. 5 is a block diagram of an embodiment of a receiver circuit including a low-frequency noise mitigation circuitry, such as the circuits of FIGS. 1 and 3.

FIG. 5 is a block diagram of a simplified embodiment of a receiver circuit 500 including a low-frequency noise mitigation circuit 506 including attenuation network 120 and associated measurement/control circuitry 508 to provide low-frequency noise mitigation such as that provided by circuit 102 in FIGS. 1 and 3. Receiver circuit 500 includes input terminal 104 for receiving RF input signal 106. Receiver circuit 500 includes a first signal path 502 and a second signal path 504. First signal path 502 is connected to front end circuitry, such as LNA 110 in FIGS. 1 and 3. Attenuation network 120 includes a terminal connected to first signal path 502, and measurement/control circuitry 508 includes an input connected to second signal path 504. Measurement/control circuitry 508 includes one or more control outputs connected to attenuation network 120 to control the resistive attenuation and the capacitive attenuation applied to first signal path 502. In this embodiment, attenuation network 120 and measurement/control circuitry 508 are provided on a single integrated circuit or semiconductor die.

Measurement/control circuitry 508 includes threshold detectors 510 (such as first threshold detector 310 and second threshold detector 312 in FIG. 3) for detecting when RF input signal 106 crosses first and second thresholds, such as first and second reference thresholds 214 and 216, respectively. Measurement/control circuitry 508 further includes comparator 122 and counter 128. Measurement/control circuitry 508 also includes control logic 512 configured to selectively adjust the resistive attenuation and the capacitive attenuation of attenuation network 120 in response to outputs from high and low peak detectors 510 and from counter 128 (as previously discussed).

Figure 6:
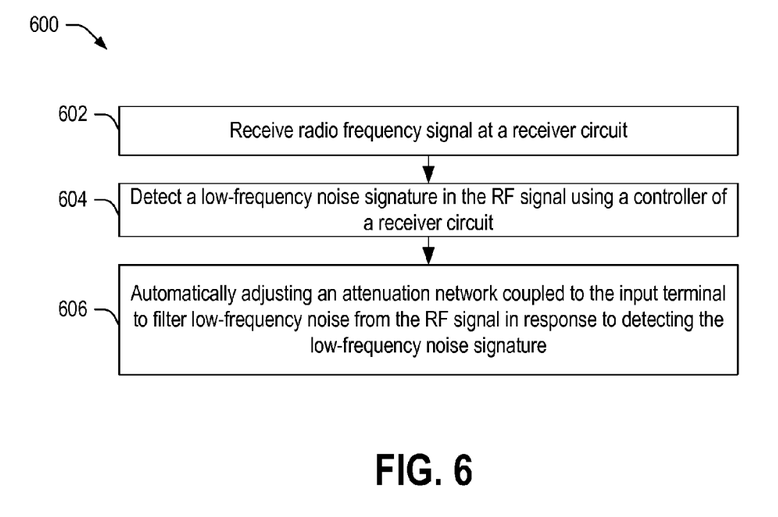
FIG. 6 is a flow diagram of an embodiment of a method of providing low-frequency noise filtering of the radio frequency signal.

FIG. 6 is a flow diagram of an embodiment of a method 600 of providing low-frequency noise filtering of RF input signal 106. At 602, an RF input signal 106 is received at an input terminal of a receiver circuit having a controller. Advancing to 604, the controller detects a low-frequency noise signature in the RF signal using a controller of a receiver circuit. Continuing to 606, the controller automatically adjusts an attenuation network coupled to the input terminal to filter low-frequency noise from the RF signal in response to detecting the low-frequency noise signature. In an embodiment, a comparator receives RF signal 106, compares RF signal 106 to a threshold, and produces an output signal in response to the comparison. The counter counts pulses in the comparator output signal, representing a number of times the amplitude of RF signal 106 crosses the peak threshold. to determine a count and provides the count to the controller. The controller selectively adjusts an attenuation network 120 of the integrated circuit in response to the count to filter low-frequency noise from the RF signal. In some embodiments, the controller selectively adjusts the attenuation network 120 based on the count and based on the amplitude of an in-band portion of the RF input signal 106 relative to the first and second thresholds.

In an example, the controller adjusts the attenuation network by adjusting at least one of a resistive attenuation and a capacitive attenuation incrementally to incrementally adjust a corner frequency of a pass band. In a particular instance, the controller selects an adjustment increment for at least one of a variable resistor and a variable capacitor based on the mode of the controller, which mode (as discussed above) is determined based on the output of counter 128 and the amount of time that has passed since the RF input signal 106 has exceeded the comparator threshold 124. Controller applies the adjustment increment to the attenuation network.

In a particular example, when the amplitude of the RF input signal 106 is less than a peak threshold, the controller selectively adjusts the attenuation network by decreasing at least one of a resistive attenuation and a capacitive attenuation of the attenuation network when the amplitude of an in-band portion of RF signal 106 is less than the first and second thresholds, decreasing the resistive attenuation of the attenuation network when the amplitude of the in-band portion is greater than the first threshold and less than the second threshold, and increasing one of the capacitive attenuation and the resistive attenuation when the amplitude of the in-band portion exceeds the first and second thresholds. In another particular example, when the amplitude of the RF signal exceeds the peak threshold, the controller selectively adjusts the attenuation network by increasing a resistive attenuation of the attenuation network if the resistive attenuation is below a maximum range of the resistive attenuation, and increasing a capacitive attenuation of the attenuation network when the resistive attenuation reaches the maximum range.

In another particular example, the controller selectively adjusts the attenuation network by decreasing at least one of a resistive attenuation and a capacitive attenuation if the amplitude has been less than the peak threshold for a first period of time (such as more than a second), selectively adjusting at least one of the resistive attenuation and the capacitive attenuation if the amplitude has been less than the peak threshold for a second period of time (such as less than approximately 300 milliseconds), and increasing at least one of the resistive attenuation and the capacitive attenuation if the amplitude exceeds the peak threshold. In another particular example, the controller selectively adjusts at least one of the resistive attenuation and the capacitive attenuation by decreasing the capacitive attenuation if the resistive attenuation is less than a maximum resistive attenuation level; adjusting neither the resistive attenuation nor the capacitive attenuation if the amplitude is less than the peak threshold, greater than the first threshold and less than the second threshold; and increasing at least one of the capacitive attenuation and the resistive attenuation when the amplitude is less than the peak threshold and is greater than the first and second thresholds.

While the above-examples largely focused on filtering of low-frequency noise at frequency levels well below a frequency band of interest (such as interfering power-line noise that is well below a frequency of the AM radio frequency band), the resistive attenuator high pass corner can be shifted into the desired signal band. Further, the capacitive attenuation applies to the frequency range of the RF signal 106, including low-frequency portions and in-band portions.

Integration of the low-frequency noise mitigation circuitry reduces the bill of materials for the circuit, reduces the overall circuit area, and provides enhanced low-frequency noise detection. Further, by using a peak detector to detect the low-frequency noise signature and by using first and second threshold detectors for detecting in-band signal levels, the controller can detect the low-frequency noise signature much faster than the frequency of the low-frequency noise. For example, looking for low-frequency power-line noise by trying to detect a single 50 Hz cycle, which takes 20 ms, allows time for the interference to be reproduced audibly within the audible output signal. Since an audible noise can be heard in as little as 7 ms, it is desirable to detect and react to such noise in less than 7 ms. Embodiments of the noise mitigation circuitry described above with respect to FIGS. 1-6 make it possible to detect and react to such low-frequency noise in less than seven milliseconds (while the RF signal 106 is crossing the comparator threshold 124 during a first half of the low-frequency cycle). In an embodiment, the controller detects the low-frequency noise in less than 7 milliseconds without accidental detection from random noise on the AM carrier signal. In a particular embodiment, the controller detects the low-frequency noise in five milliseconds or less.

In conjunction with the circuits and methods described above with respect to FIGS. 1-6 and Table 1, a low-frequency noise mitigation circuit is described that includes an attenuation network and a controller configured to selectively adjust the attenuation network based on an amplitude of an RF signal. The controller uses a peak threshold to detect a low-frequency noise signature, such as a sixty hertz signal attributable to power-line noise, and adjusts one of a capacitive attenuation and a resistive attenuation of the attenuation network based on a comparison of an in-band portion of RF signal 106 to first and second thresholds. The controller can adjust the attenuation network incrementally, such as by selectively applying an incremental adjustment to one of a resistive attenuation and a capacitive attenuation, as needed to filter low-frequency noise from the RF signal.

Although the present invention has been described with reference to preferred embodiments, workers skilled in the art will recognize that changes may be made in form and detail without departing from the scope of the invention.

What is claimed is:

1. A circuit comprising:
   an input terminal for receiving a radio frequency (RF) signal; and
   a noise mitigation circuit coupled to the input terminal, the noise mitigation circuit configured to determine a count of a number of times the RF signal crosses above a threshold and crosses below the threshold, to detect a low-frequency noise signature in the RF signal based on the count, and to automatically adjust an attenuation network to filter low-frequency noise from the RF signal in response to detecting the low-frequency noise signature.

2. The circuit of claim 1, wherein the noise mitigation circuit and the input terminal are included in a semiconductor die.

3. The circuit of claim 1, wherein:
   the RF signal comprises an amplitude modulated (AM) radio signal; and
   the low-frequency noise comprises noise within a frequency range below approximately 100 kilohertz.

4. The circuit of claim 1, wherein the noise mitigation circuit comprises:
   a high pass filter including a first terminal coupled to the input terminal and including a control input; and
   a controller including a first input coupled to the input terminal and a control output coupled to the control input of the high pass filter, the controller configured to selectively adjust the high pass filter to attenuate the RF signal in response to detection of the low-frequency noise.

5. The circuit of claim 4, wherein the high pass filter comprises:
   a variable resistor including a first terminal coupled to the input terminal and a second terminal coupled to a low-impedance voltage, the variable resistor having a resistance and responsive to the controller to adjust the resistance; and
   at least one variable capacitor responsive to the controller to configure a capacitive attenuation.

6. The circuit of claim 4, wherein the noise mitigation circuit further comprises:
   a peak detector including a first input for receiving the RF signal, a second input for receiving the threshold, and an output for providing a first peak detection signal; and
   a counter including an input coupled to the output of the peak detector and an output for providing the count indicating the number of times the RF signal crosses the threshold within a pre-determined time period.

7. The circuit of claim 6, further comprising:
   a first threshold detector configured to produce a first detector output when an in-band portion of the RF signal exceeds a first threshold; and
   a second threshold detector configured to produce a second detector output when the in-band portion of the RF signal exceeds a second threshold that is lower than the first threshold; and
   wherein the controller is coupled to the counter, the first threshold detector, and the second threshold detector, the controller is configured to selectively adjust the attenuation network in response to the count and to the first and second detector outputs.

8. A method comprising:
   receiving a radio frequency (RF) signal at an input terminal of an integrated circuit;
   determining a count of a number of times the RF signal crosses above a threshold and crosses below the threshold;
   detecting a low-frequency noise signature in the RF signal in response to determining the count using a controller of a receiver circuit; and
   automatically adjusting an attenuation network coupled to the input terminal to filter low frequency noise from the RF signal in response to detecting the low-frequency noise signature.

9. The method of claim 8, wherein detecting the low-frequency noise signature comprises:
   detecting the count representing multiple times that the RF signal crossed the threshold during a first period of time; and
   selectively adjusting the attenuation network of the integrated circuit in response to the count to filter the low-frequency noise from the RF signal.

10. The method of claim 8, wherein automatically adjusting the attenuation network comprises selectively adjusting at least one of a resistive attenuation and a capacitive attenuation incrementally.

11. The method of claim 8, wherein detecting the low-frequency noise signature in the RF signal comprises:
    counting a number of times an amplitude of the RF signal crosses the threshold to determine a count;
    detecting if an in-band portion of the RF signal exceeds a first threshold to produce a first detector output; and
    detecting if the in-band portion of the RF signal exceeds a second threshold to produce a second detector output.

12. The method of claim 11, wherein automatically adjusting the attenuation network comprises:
    selecting an adjustment increment for at least one of a variable resistor and a variable capacitor based on the count, the first detector output, and the second detector output; and
    applying the adjustment increment to the attenuation network.

13. The method of claim 12, wherein, when the amplitude of the RF signal is less than the threshold, automatically adjusting the attenuation network comprises:
    decreasing at least one of a resistive attenuation and a capacitive attenuation of the attenuation network when the in-band portion is less than the first and second thresholds;
    decreasing the resistive attenuation of the attenuation network when the in-band portion exceeds the first threshold and is less than the second threshold; and
    increasing one of the capacitive attenuation and the resistive attenuation when the in-band portion exceeds the first and second thresholds.

14. The method of claim 12, wherein, when the amplitude of the RF signal exceeds the threshold, automatically adjusting the attenuation network comprises:

increasing a resistive attenuation of the attenuation network if the resistive attenuation is below a maximum range of the resistive attenuation; and increasing a capacitive attenuation of the attenuation network when the resistive attenuation reaches the maximum range.

15. The method of claim 12, wherein, selectively adjusting the attenuation network comprises:

decreasing at least one of a resistive attenuation and a capacitive attenuation if the amplitude has been less than the threshold for a first period of time;

selectively adjusting at least one of the resistive attenuation and the capacitive attenuation if the amplitude has been less than the threshold for a second period of time; and increasing at least one of the resistive attenuation and the capacitive attenuation if the amplitude exceeds the threshold.

16. The method of claim 14, wherein selectively adjusting at least one of the resistive attenuation and the capacitive attenuation comprises:

decreasing the capacitive attenuation if the resistive attenuation is less than a maximum resistive attenuation level;

adjusting neither the resistive attenuation nor the capacitive attenuation if the amplitude is less than the threshold and the in-band portion exceeds the first threshold and is less than the second threshold; and increasing at least one of the capacitive attenuation and the resistive attenuation when the amplitude is less than the threshold and the in-band portion exceeds the first and second thresholds.

17. integrated circuit comprising:

an input terminal configurable to couple to a signal source for receiving a radio frequency (RF) signal;

a controller configured to determine a count of a number of times the RF signal crosses a threshold from below the threshold and crosses the threshold from above the threshold, to detect a low-frequency noise signature within the RF signal in response to determining the count, and to generate an attenuation adjustment signal in response to detecting the low frequency noise signature; and an attenuation network including a first input coupled to the input terminal and a second input coupled to the controller, the attenuation network responsive to the attenuation adjustment signal to adjust a cut off frequency to filter low-frequency noise from the RF signal.

18. The integrated circuit of claim 17, further comprising:

a comparator including a first input for receiving the RF signal, a second input for receiving the threshold, and an output for providing a comparator output signal;

a counter including an input coupled to the output of the comparator and an output coupled to the controller, the counter configured to count the number of times the RF signal crosses the threshold to produce a count; and wherein the controller is configured to detect a noise signature corresponding to low frequency noise in the RF signal in response to determining the count.

19. The integrated circuit of claim 18, further comprising:

a first threshold detector including a detector input coupled to the input terminal and a detector output coupled to the controller, the first threshold detector to produce a first output signal on the detector output when an in-band portion of the RF signal exceeds a first threshold;

a second threshold detector including a second detector input coupled to the input terminal and a detector output coupled to the controller, the second threshold detector to produce a second output signal on the second detector output when the in-band portion exceeds a second threshold;

wherein the controller generates the attenuation adjustment signal in response to the count and in response to the first and second output signals.

20. The integrated circuit of claim 19, wherein:

the attenuation network comprises a resistive attenuation having a variable resistance and a capacitive attenuation having a variable capacitance; and wherein the controller selectively increases one of the resistive attenuation and the capacitive attenuation of the attenuation network when an amplitude of the RF signal crosses the peak threshold.

21. The integrated circuit of claim 19, wherein:

the attenuation network comprises a resistive attenuation and a capacitive attenuation; and wherein the controller selectively decreases one of the resistive attenuation and the capacitive attenuation of the attenuation network when the amplitude of the RF signal is below the threshold for a period of time.

22. The integrated circuit of claim 17, wherein:

the RF signal comprises an amplitude modulated (AM) radio signal; and the low-frequency noise comprises at least one of power line noise, traffic light signal noise, Integrated Services Digital Network (ISDN) noise, and in-band noise.

23. The integrated circuit of claim 17, wherein the attenuation network changes the cut off frequency of a pass band incrementally in response to the attenuation adjustment signal.

* * * * *